US012157250B2

(12) United States Patent
Batty (10) Patent No.: US 12,157,250 B2
(45) Date of Patent: Dec. 3, 2024

(54) COMPOSITE WOOD PANELS WITH CORRUGATED CORES AND METHOD OF MANUFACTURING SAME

(71) Applicant: Bondcore ÖU, Tallinn (EE)

(72) Inventor: Ronald J. Batty, Perth (CA)

(73) Assignee: BONDCORE ÖU, Tallinn (EE)

( * ) Notice: Subject to any disclaimer, the term of this patent is extended or adjusted under 35 U.S.C. 154(b) by 0 days.

(21) Appl. No.: 17/726,715

(22) Filed: Apr. 22, 2022

(65) Prior Publication Data
US 2022/0242007 A1    Aug. 4, 2022

Related U.S. Application Data

(60) Continuation-in-part of application No. 16/904,761, filed on Jun. 18, 2020, now Pat. No. 11,318,636, (Continued)

(30) Foreign Application Priority Data

Mar. 21, 2016  (CA) .................................. CA 2924288

(51) Int. Cl.
*B27N 3/00* (2006.01)
*B27N 3/04* (2006.01)
(Continued)

(52) U.S. Cl.
CPC .............. *B27N 7/00* (2013.01); *B27N 3/002* (2013.01); *B27N 3/04* (2013.01); *B27N 5/00* (2013.01); *B27N 7/005* (2013.01); *B32B 3/28* (2013.01); *B32B 7/03* (2019.01); *B32B 7/12* (2013.01); *B32B 7/14* (2013.01); *B32B 21/02* (2013.01); *B32B 21/13* (2013.01); *B32B 37/06* (2013.01); *B32B 37/10* (2013.01); *B32B 37/12* (2013.01); *B32B 37/18* (2013.01); *B32B 38/0004* (2013.01); *B32B 38/0012* (2013.01);
(Continued)

(58) Field of Classification Search
CPC ........................................................ B27N 3/04
See application file for complete search history.

(56) References Cited

U.S. PATENT DOCUMENTS 1,572,896 A    1/1926   Longley
2,373,736 A    4/1945   Bolung
(Continued)

FOREIGN PATENT DOCUMENTS

CA    2988159 A1    6/2019

OTHER PUBLICATIONS

Yang Cao, Characterization of PF/PVC Hybrid Adhesive-Wood Interaction and its Effect on Wood Strand Composites Performance, Aug. 2010.
(Continued)

*Primary Examiner* — Andrew D Graham
(74) *Attorney, Agent, or Firm* — JK Intellectual Property Law, PA (57) ABSTRACT

A composite wood panel is manufactured from thin wood laminae cut from wood unsuitable for peeler logs or dimensional lumber. At least one bonding agent is applied to the wood laminae, and they are formed into a randomly oriented mat that is compressed into a thin wood web that can be a corrugated web or a flat web that is permanently set in a single press operation.

12 Claims, 3 Drawing Sheets

Related U.S. Application Data which is a division of application No. 15/414,810, filed on Jan. 25, 2017, now Pat. No. 10,723,039.

(51) Int. Cl.

| | | |
|---|---|---|
| *B27N 5/00* | (2006.01) | |
| *B27N 7/00* | (2006.01) | |
| *B32B 3/28* | (2006.01) | |
| *B32B 7/03* | (2019.01) | |
| *B32B 7/12* | (2006.01) | |
| *B32B 7/14* | (2006.01) | |
| *B32B 21/02* | (2006.01) | |
| *B32B 21/13* | (2006.01) | |
| *B32B 37/06* | (2006.01) | |
| *B32B 37/10* | (2006.01) | |
| *B32B 37/12* | (2006.01) | |
| *B32B 37/18* | (2006.01) | |
| *B32B 38/00* | (2006.01) | |
| *B32B 38/08* | (2006.01) | |

(52) U.S. Cl.
CPC ........ *B32B 38/08* (2013.01); *B32B 2250/03* (2013.01); *B32B 2250/05* (2013.01); *B32B 2250/40* (2013.01); *B32B 2250/42* (2013.01); *B32B 2255/08* (2013.01); *B32B 2307/7145* (2013.01); *B32B 2309/10* (2013.01); *B32B 2309/105* (2013.01); *B32B 2317/16* (2013.01); *B32B 2419/00* (2013.01); *B32B 2439/62* (2013.01); *B32B 2439/70* (2013.01); *B32B 2607/00* (2013.01)

(56) References Cited

U.S. PATENT DOCUMENTS

| | | | |
|---|---|---|---|
| 2,442,492 A | 6/1948 | Englert et al. | |
| 2,465,941 A | 3/1949 | Steen | |
| 2,542,804 A | 1/1951 | Stokes et al. | |
| 2,640,517 A | 6/1953 | De Mello | |
| 2,689,092 A | 9/1954 | Clarke et al. | |
| 2,766,787 A | 10/1956 | Knowles | |
| 2,722,789 A | 12/1956 | Clark | |
| 2,786,005 A | 3/1957 | Clark | |
| 2,840,127 A | 6/1958 | Stokes et al. | |
| 2,907,071 A * | 10/1959 | Meiler | B27N 3/24 264/118 |
| 3,025,895 A | 1/1960 | Girard | |
| 3,003,024 A | 10/1961 | Bryant | |
| 3,011,938 A * | 12/1961 | Chapman | D21J 1/00 162/207 |
| 3,164,511 A * | 1/1965 | Elmendorf | E04C 2/16 428/218 |
| 3,286,745 A | 11/1966 | Meis | |
| 3,338,767 A | 8/1967 | Charles | |
| 3,721,329 A * | 3/1973 | Turner | B65G 47/1492 198/383 |
| 3,880,975 A * | 4/1975 | Lundmark | B27N 3/08 264/122 |
| 3,913,643 A | 10/1975 | Lambert | |
| 4,185,787 A | 1/1980 | Plyler | |
| 4,241,133 A | 12/1980 | Und et al. | |
| 4,290,988 A * | 9/1981 | Nopper | D21H 27/00 264/118 |
| 4,346,744 A | 8/1982 | Beer et al. | |
| 4,408,544 A | 10/1983 | Haataja | |
| 4,440,708 A | 4/1984 | Haataja | |
| 4,469,216 A | 9/1984 | Haataja et al. | |
| 4,675,138 A | 6/1987 | Bach et al. | |
| 4,816,103 A | 3/1989 | Ernest | |
| 4,960,553 A | 10/1990 | Debruine et al. | |
| 4,964,447 A | 10/1990 | Farrell et al. | |
| 5,002,713 A | 3/1991 | Palardy et al. | |
| 5,047,280 A | 9/1991 | Bach | |
| 5,064,689 A * | 11/1991 | Young, Sr. | D04H 1/43916 264/122 |
| 5,067,536 A * | 11/1991 | Liska | B27N 3/143 144/380 |
| 5,143,311 A | 9/1992 | Laster | |
| 5,152,251 A | 10/1992 | Aukeman et al. | |
| 5,161,591 A * | 11/1992 | Sealey | B27N 3/143 425/328 |
| 5,374,474 A * | 12/1994 | Pratt | B27N 3/007 264/331.16 |
| 5,427,162 A | 6/1995 | Carter | |
| 5,612,129 A * | 3/1997 | Karhuketo | B29B 17/0026 428/221 |
| 5,732,460 A | 3/1998 | Paternoster et al. | |
| 5,736,209 A * | 4/1998 | Andersen | C08J 5/18 428/152 |
| 5,769,204 A | 6/1998 | Okada et al. | |
| 5,810,961 A * | 9/1998 | Andersen | B28B 23/0087 264/282 |
| 5,811,176 A * | 9/1998 | Locati | B27N 3/12 427/393 |
| 5,882,462 A * | 3/1999 | Donecker | B29B 11/16 264/137 |
| 5,932,038 A * | 8/1999 | Bach | B27N 1/00 264/437 |
| 5,948,198 A | 9/1999 | Blyt | |
| 5,972,265 A * | 10/1999 | Marra | B27N 1/0263 425/81.1 |
| 6,152,200 A | 11/2000 | Smothers | |
| 6,511,567 B1 | 1/2003 | Ruggie et al. | |
| 6,569,540 B1 * | 5/2003 | Preston | B27N 1/006 524/13 |
| 6,916,523 B2 | 6/2005 | Haataja | |
| 6,997,692 B2 | 2/2006 | Pearson | |
| 7,021,339 B2 | 4/2006 | Hagiwara et al. | |
| 7,077,998 B2 | 7/2006 | Gosselin | |
| 8,268,430 B2 * | 9/2012 | Johnson | B27N 3/04 428/221 |
| 8,475,894 B2 | 7/2013 | Noble et al. | |
| 8,512,498 B2 | 8/2013 | Belanger et al. | |
| 2002/0185063 A1 | 12/2002 | Kuang-Wen | |
| 2005/0241267 A1 * | 11/2005 | Wu | B27D 1/06 52/783.11 |
| 2006/0060264 A1 * | 3/2006 | Glover | B27L 11/02 144/363 |
| 2006/0060290 A1 * | 3/2006 | Jarck | B27N 3/04 156/229 |
| 2006/0174975 A1 | 10/2006 | Wan et al. | |
| 2007/0000602 A1 * | 1/2007 | Sprague | B27N 5/00 156/272.4 |
| 2007/0175041 A1 * | 8/2007 | Hardwick | B27N 5/00 29/897.3 |
| 2008/0023868 A1 * | 1/2008 | Slaven | B27N 1/00 264/109 |
| 2008/0000547 A1 | 3/2008 | Barker et al. | |
| 2009/0077924 A1 * | 3/2009 | Lau | B27N 3/04 52/309.1 |
| 2009/0169753 A1 * | 7/2009 | Jarck | B27N 1/00 427/317 |
| 2009/0197051 A1 * | 8/2009 | Swan | C09J 7/35 428/182 |
| 2009/0255205 A1 * | 10/2009 | Noble | B32B 21/10 52/630 |
| 2009/0317632 A1 * | 12/2009 | Ruhdorfer | B27N 1/00 428/511 |
| 2010/0015420 A1 | 1/2010 | Riebel et al. | |
| 2010/0078985 A1 | 1/2010 | Mahoney et al. | |
| 2010/0062233 A1 * | 3/2010 | Cohen | B65D 19/0067 428/452 |
| 2010/0099802 A1 * | 4/2010 | Browning | C08F 2/24 524/25 |
| 2010/0119857 A1 * | 5/2010 | Johnson | B27N 3/04 428/537.1 |
| 2010/0310893 A1 * | 12/2010 | Derbyshire | B32B 21/02 524/13 |
| 2011/0003136 A1 * | 1/2011 | Schmidt | B27N 3/005 428/313.5 |

(56) References Cited

U.S. PATENT DOCUMENTS

| | | | |
|---|---|---|---|
| 2011/0024932 A1* | 2/2011 | Wong | B27N 5/00 264/319 |
| 2011/0039090 A1* | 2/2011 | Weinkotz | C08L 97/02 428/313.5 |
| 2011/0062636 A1* | 3/2011 | Lewellin | B27N 3/00 264/475 |
| 2011/0089611 A1* | 4/2011 | Hoffman | B27N 3/24 425/151 |
| 2011/0217550 A1* | 9/2011 | Peretolchin | B27N 3/005 428/537.1 |
| 2012/0138224 A1* | 6/2012 | Peretolchin | C08L 97/02 156/308.2 |
| 2012/0141772 A1* | 6/2012 | Braun | C08L 97/02 428/313.5 |
| 2013/0001827 A1 | 1/2013 | Trost et al. | |
| 2013/0017359 A1* | 1/2013 | Selley | C08L 97/02 428/221 |
| 2013/0065012 A1* | 3/2013 | Parker | C09J 189/00 106/155.21 |
| 2013/0190428 A1* | 7/2013 | Varnell | C08L 99/00 524/18 |
| 2013/0276951 A1* | 10/2013 | Speidel | B27N 3/14 156/62.2 |
| 2013/0291763 A1* | 11/2013 | Pynnonen | C08L 97/02 524/13 |
| 2013/0292864 A1* | 11/2013 | Breyer | B29C 31/02 366/76.2 |
| 2014/0004355 A1* | 1/2014 | Schade | B32B 5/26 156/62.8 |
| 2014/0272352 A1* | 9/2014 | Tilton | C08J 11/06 428/335 |
| 2014/0361465 A1* | 12/2014 | Lanza | B27N 3/007 264/460 |
| 2014/0363664 A1* | 12/2014 | Gier | D21H 17/13 162/158 |
| 2015/0017425 A1* | 1/2015 | Schade | B27N 3/08 264/331.19 |
| 2015/0275429 A1* | 10/2015 | Higuchi | B27N 3/04 162/261 |
| 2016/0039981 A1* | 2/2016 | Balogh | D21H 17/62 524/14 |
| 2016/0257814 A1* | 9/2016 | Schade | B29C 43/203 |
| 2016/0264830 A1* | 9/2016 | Gier | C08K 5/5435 |
| 2016/0288880 A1 | 10/2016 | Eckstein et al. | |
| 2016/0312405 A1* | 10/2016 | Murayama | D21H 17/20 |

OTHER PUBLICATIONS

Office Action for Canadian Application No. 3,185,986, dated Apr. 3, 2024.

* cited by examiner

COMPOSITE WOOD PANELS WITH CORRUGATED CORES AND METHOD OF MANUFACTURING SAME

RELATED APPLICATIONS

This application is a continuation-in-part of U.S. patent application Ser. No. 16/904,761 filed on Jun. 18, 2020, which was a division of U.S. patent application Ser. No. 15/414,810 filed Jan. 25, 2017, now U.S. Pat. No. 10,723,039 which issued on Jul. 28, 2020, the specification of which is incorporated herein by reference in its entirety.

FIELD OF THE INVENTION

This invention relates in general to composite wood panels and, in particular, to novel composite wood panels and wood panels with corrugated cores, and methods of manufacturing same.

BACKGROUND OF THE INVENTION

There is a long history of creating composite wood panels and structural members from wood materials unsuitable for peeler logs or dimensional lumber, as described in Applicant's above-identified United States patent incorporated herein by reference.

Despite the long history of development, composite wood panels are heavier, less flex resistant and more susceptible to moisture intrusion than plywood or solid wood.

Consequently, Applicant invented the novel method for cutting wood lamina and the process for consolidating the wood laminae using the combination of a cold set bonding agent and a hot set bonding agent to form a thin, flexible sheet that could be cold rolled and then flat pressed or corrugated in a final press in a subsequent process to form flat panels or rigid panel cores, as described in detail in the above-referenced United States patent.

However, there remains a need for simplifying that process and providing strong, lightweight wood panels with improved water resistance and other desirable properties.

SUMMARY OF THE INVENTION

It is therefore an object of the invention to provide a strong, light-weight wood panel and low density composite wood panels with corrugated cores, and a method of manufacturing same in a single-step process.

The invention therefore provides a method of manufacturing a composite wood web, comprising steps of: cutting wood laminae having a length of about 75 mm-150 mm, a width of about 10 mm-50 mm, and a thickness of about 0.25 mm-0.4 mm; drying the wood laminae to predetermined moisture content by weight of the wood laminae; sorting the wood laminae so that all wood laminae for the composite wood panel have dimensions within a tolerance of 5% in length and thickness and a tolerance of 10% in width; applying at least one bonding agent to the wood laminae; forming the wood laminae into a mat of randomly oriented wood laminae on an infeed of a high-pressure final press, the mat having a thickness adequate to produce a web of 0.5 mm-3 mm; and final pressing the mat in the high-pressure final press to permanently set the at least one bonding agent to produce a composite wood web.

The invention further provides a method of manufacturing a corrugated composite wood web, comprising steps of: cutting wood laminae having a length of about 75 mm-150 mm, a width of about 10 mm-50 mm, and a thickness of about 0.25 mm-0.4 mm; drying the wood laminae to predetermined moisture content by weight of the wood laminae; sorting the wood laminae so that all wood laminae for the composite wood panel have dimensions within a tolerance of 5% in length and thickness and a tolerance of 10% in width; applying at least one bonding agent to the wood laminae; forming the wood laminae into a mat of randomly oriented wood laminae, the mat having a thickness adequate to produce a web of 0.5 mm-3 mm; consolidating the mat in a low-temperature, low-pressure consolidation stage of a three-stage corrugation press to form a flat consolidated wood web; pre-forming the flat consolidated wood web in a low-temperature pre-forming stage of the three-stage corrugation press to dry the wood web and pre-form corrugation bends in the flat consolidated wood web; and fully corrugating the wood web with pre-formed corrugation bends in a high-pressure corrugating press section of the three-stage corrugation press to produce a corrugated wood web.

The invention yet further provides a composite wood web comprising a thin, pliable web having a thickness of 0.5 mm-3.0 mm, the wood web consisting of wood laminae having a length of at most 150 mm, a width of at most 50 mm, and a thickness of at most 0.4 mm, the wood laminae all having a variation in length of at most 5%, a variation in width of at most 10%, and a variation in thickness of at most 5%, the laminae being randomly oriented in the web and adhered together by at least one bonding agent.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a novel composite wood web manufactured using one or more bonding agents applied to wood laminae cut and sorted to exacting specifications. The wood laminae are cut from raw wood using the process described in Applicant's above-identified United States patent, except that for the purposes of this invention a thickness of the wood laminae is from 0.25 mm-0.40 mm (0.0098"-0.0157"), while the length, width a variation tolerances remain the same. The composite wood web can be quite thin and very flexible, permitting the wood web to be corrugated to provide corrugated cores for corrugated-core composite wood panels useful in packaging and structural applications. The composite wood webs are manufactured from a mat of randomly oriented wood laminae to which one or more bonding agents have been applied. For a corrugated wood web, the mat is corrugated in a three-stage corrugation press having a low-temperature consolidation press stage to produce a consolidated mat that is pre-formed in a pre-form press stage and corrugated in a high-pressure final press stage for strength and a permanent bond. For a flat wood web, the mat may be prepared directly on an infeed belt of a high-pressure final press that compresses and permanently bonds the mat. The corrugated wood web may be cut into panel core-sized pieces for post processing or shipping, or immediately bonded to one or more flat face panels to produce corrugated core panels or sheets. The flat wood web may be rolled into rolls for post processing or shipping or cut into panel-sized pieces for post processing or shipping depending on a thickness of the wood web and a flexibility of the cured bonding agent(s) used. Two or more of the flat panels or corrugated core panels may be laminated together to provide stronger flat panels or corrugated core panels for packaging or structural applications. A bonding agent may be applied between the laminations to enhance inter-lamination bonding. Structural panels have corrugated cores with flat crests that provide additional bonding agent area for bonding the corrugated core crests to the face panels. Two or more corrugated cores may be interleaved between three or more flat panels to provide corrugated core panels with extra strength and rigidity.

Figure 1:
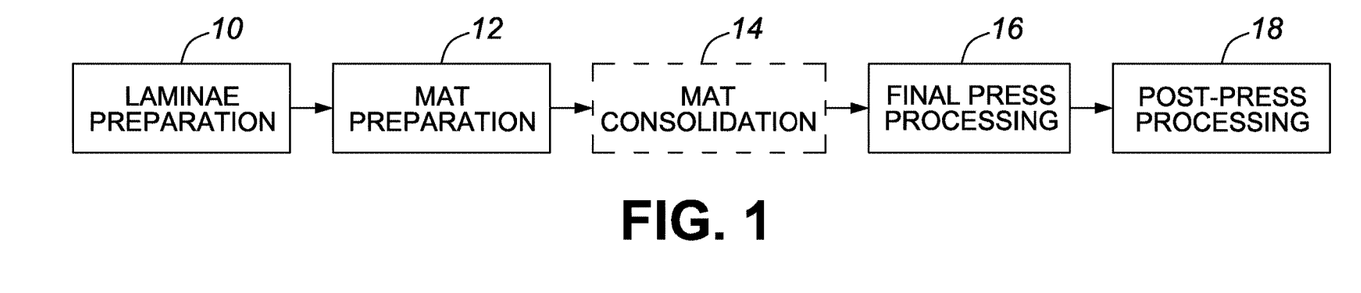
FIG. 1 is a block diagram of an overview of a process for manufacturing composite wood webs in accordance with the invention.

FIG. 1 is a block diagram of an overview of a process for manufacturing composite wood webs in accordance with the invention. The process begins with wood lamina preparation 10, which involves: cutting the laminae from raw wood at a thickness of 0.25 mm-0.40 mm (0.0098"-0.0157"), a length of about 75 mm-150 mm, a width of 10 mm-50 mm using Applicant's proprietary lamina cutters, drying the cut wood laminae to a predetermined moisture content by weight, sorting the wood laminae using Applicant's proprietary sorting process, all of which are described in detail in Applicant's above-identified United States patent; and, applying bonding agent(s) using bonding agent application methods that are dependent on the bonding agent(s) selected, as will be explained below.

It has been determined that very thin wood webs can be manufactured in a continuous process using one of several bonding agents and bonding agent combinations applied to wood laminae that have been cut to thickness tolerances in accordance with the invention and sorted to the exacting specifications described in Applicant's above-referenced patent. A mat of the prepared wood laminae for producing a corrugated wood web is compressed and corrugated in a three-stage corrugation press. The mat is first consolidated in a low-temperature consolidation stage of the corrugation press, then pre-formed in a pre-form stage of the consolidation press before a high-pressure corrugation press stage finishes the corrugated wood web. The mat for a thin flat sheet may be prepared directly on an infeed belt of a high-pressure flat press.

Examples of suitable bonding agents and bonding agent combinations are described below with reference to Table 1. In one embodiment, the bonding agent(s) are applied in a drum blender using application methods that are known in the art. The prepared wood laminae are then moved to mat preparation 12 where a mat formation machine known in the art lays a thin mat of randomly oriented wood laminae on the infeed belt of a press. For the corrugated wood webs, the thin mat is laid on the infeed of a three-stage press where the prepared mat is consolidated 14 to provide a consolidated mat that is coherent but may be fragile. As described above, the consolidated mat is then pre-formed in a second stage of the three-stage press and corrugated in a final stage that performs final press finishing 16 where the consolidated mat is finished in a high-pressure corrugation press stage to produce a corrugated wood web that is further processed in post-press processing 18, all of which will be described below in more detail. For the flat wood webs, the mat is prepared 12 directly on a novel infeed of a high-pressure finishing press that compresses and bonds the wood laminae in final press finishing 16 of the flat wood web, which is further processed in post-press processing 18, all of which will be described below in more detail.

Table 1 shows bonding agents and bonding agent combinations that have proven to be effective for the purposes of the invention. It should be noted that the bonding agents listed in Table 1 are exemplary only and Table 1 is not intended to provide an exhaustive listing of bonding agents that can be used alone or in combination to make thin wood webs using wood laminae prepared in accordance with the invention.

TABLE 1

| Bonding agent(s) | Application(s) | Properties | Bonding agent (BA) ratio | BA/Wood ratio (by wt.) | Consolidation temp. (40 sec. dwell) |
| --- | --- | --- | --- | --- | --- |
| PRF | Corrugated cores for exterior construction products | Very stiff panels and cores - lower thickness limit of 2 mm; good water resistance. | 100% | 4-12% | 93 C.-121 C. (200 F.-250 F.) |
| PVAc Powder | Thin, flexible sheets for food packaging, flat panels and corrugated cores for packaging materials, rigid panels for interior construction projects | Requires pre-heat of laminae/PVAc prior to consolidation for best bond; Water resistant; emission free for food packaging and interior use; provides a stable, flexible corrugated web. | 100% | 4-8% | 93 C.-121 C. (200 F.-250 F.) |
| PVAc Powder and PRF | Flat panels and corrugated cores for packaging materials and | Improved panel flexibility and water resistance, reduced | 20/80-50/50 | 4-12% | 93 C.-121 C. (200 F.-250 F.) |

TABLE 1-continued

| Bonding agent(s) | Application(s) | Properties | Bonding agent (BA) ratio | BA/Wood ratio (by wt.) | Consolidation temp. (40 sec. dwell) |
|---|---|---|---|---|---|
| PVAc Powder and MDI | construction products Flat panels and corrugated cores for packaging materials and construction products | emissions over PRF only. Improved press release; flexible panels - lower thickness limit of 0.5 mm; good water resistance dependent on PVAc/MDI ratio. | 80/20-70/30 | 5-10% | 93 C.-121 C. (200 F.-250 F.) |
| PRF and MDI | Flat panels and corrugated cores for construction products | Stiffness dependent on PRF/MDI ratio - the more MDI, the more flexible the panel; very water resistant to waterproof depending on bonding agent/lamina ratio. | 30/70-50/50 | 4-8% | 93 C.-121 C. (200 F.-250 F.) |
| EVA Powder | Thin, flexible sheets for food packaging, flat panels and corrugated cores for packaging materials, rigid panels for non-load bearing construction projects | Requires pre-heat of laminae/EVA prior to consolidation for best bond; Very water resistant to waterproof; emission free for food packaging and non-load bearing interior use; suitable for non-load bearing exterior use; corrugated cores must be bonded to a backing sheet to avoid corrugation creep. | 100% | 4-8% | 93 C.-121 C. (200 F.-250 F.) |
| EVA Powder and PRF | Flat panels and corrugated cores for packaging materials and construction products | Improved panel flexibility and water resistance, reduced emissions over PRF only. | 20/80-50/50 | 4-12% | 93 C.-121 C. (200 F.-250 F.) |
| EVA Powder and MDI | Flat panels and corrugated cores for packaging materials and interior/exterior construction products | Improved press release; very water resistant to waterproof; emission free for food packaging and interior use; suitable for exterior use. | 20/80-30/70 | 5-10% | 93 C.-121 C. (200 F.-250 F.) |

PRF (phenol-resorcinol-formaldehyde) is an aqueous syrup commonly used as a thermoset wood bonding agent for producing chip board, flake board, strand board and the like. PRF is known to have a tacky stage when heated to a temperature below its thermoset temperature. The PRF tacky stage is considered a nuisance in the wood products industry. It has been discovered that this tacky stage can be exploited to consolidate a prepared wood laminae mat before it enters the last two stages of a high-pressure high-temperature corrugation press. In one embodiment, PRF is applied to wood laminae using a spray applicator or the like in a drum blender in a manner known in the art. After application, the PRF provides tack-free wood laminae that are easily managed by mat formation equipment. PRF is applied to the wood laminae at a rate of about 4%-12% by weight, depending on the strength and water resistance of the finished wood web that is desired. At 12% by weight of PRF, a virtually waterproof corrugated panel is provided. PRF produces a very rigid and brittle panel. Consequently, panels made with 100% PRF that have a finished thickness of less than 2 mm (0.08") are too brittle to be practical. Although PRF is known to emit formaldehyde as it cures, corrugated panels in accordance with the invention are made from very thin laminations (2 mm-3 mm) that gas-off quickly. Corrugated PRF panels are extremely stiff and durable and useful for structural panels that may be used in exterior construction projects.

PVAc (polyvinyl acetate) powder is a synthetic resin prepared by the polymerization of vinyl acetate. Powdered PVAc is an unhydrolyzed form of the polymer and has proven to be suitable for the manufacture of thin, flexible sheets useful for food packaging, flat panels and corrugated cores for packaging materials, and rigid panels for interior construction products that are non-load bearing, and the like. The corrugated cores are stable and somewhat flexible. The PVAc powder is added to the dried laminae at a rate of about 4%-8% by weight, depending on desired panel properties. In one embodiment, the powdered PVAc is added to the laminae as a dry powder in the drum blender. The amount of PVAc powder carried to the three-stage corrugation press by each lamina can be regulated by controlling a moisture content of the laminae. The higher the moisture content of the wood laminae, the more PVAc powder that adheres to each wood lamina. It has been determined that corrugated sheets manufactured using methods in accordance with the invention permit the use of wood laminae having a moisture content by weight of up to at least about 20% by weight of the wood laminae, without perceptible effect on the strength or appearance of the corrugated wood web. Alternatively, or in addition, a small amount of water may be sprayed on the wood laminae as a mist to moisten the laminae surfaces before or during the addition of the PVAc powder. It has also been determined that when the bonding agent is 100% PVAc powder, a superior bond is achieved if the mat of wood laminae coated with PVAc powder is pre-heated by a mat pre-heater and finish pressed by an unheated high-pressure final press, as will be described below.

PVAc powder and PRF can be used together in the process in accordance with the invention to produce wood webs for flat panels or corrugated cores for packaging materials and construction products. The PVAc lends flexibility to the finished wood web and reduces PRF emissions. The PRF provides thermoset cross-linking that contributes to wood web strength. The ratio of PVAc to PRF is flexible. However, in one embodiment the PRF component is kept to a minimum required for good cross-linking in the finished wood web. In general, a combination of about 20/80 to 30/70 of PVAc/PRF provides satisfactory results when added to wood laminae at about 4%-12% by weight. In one embodiment, the PRF is added to the wood laminae in the drum blender prior to adding the PVAc powder.

PVAc powder can also be combined with MDI (diphenylmethane 4,4'-diisocyanate), a known bonding agent used in many applications including limited use in the manufacture of chipped wood products. The PVAc/MDI bonding agent combination produces a very tough and flexible wood web which can be as thin as 0.5 mm (0.02"). The MDI improves water resistance and panel strength, but it is expensive and adheres to exposed or untreated press surfaces. The PVAc helps reduce press adhesion but anti-adhesion membranes or MDI release agents must still be applied press surfaces. Consequently, in one embodiment the PVAc/MDI ratio is kept in a range between 20/80 and 30/70. As with PVAc/PRF, in one embodiment the MDI may be added to the prepared wood laminae in the drum blender prior to adding the powdered PVAc. The PVAc/MDI is added to the prepared laminae at a rate of about 5-10% by weight of the prepared wood laminae, depending on desired properties of the finished wood web. The flat panels and corrugated cores made with PVAc/MDI have good water resistance that improves with higher MDI ratios and are useful for the manufacture of packaging materials and construction products for both exterior and interior use.

PRF and MDI are bonding agents that perform well together for making corrugated and flat wood panels in accordance with the invention. The MDI lends flexibility to the wood web, reduces emissions, and improves the water resistance. The PRF improves press release though anti-stick membranes or release agents are still required on press surfaces. The PRF consolidates the prepared mat in the consolidation press. In one embodiment the PRF/MDI ratio is between 30/70 and 50/50, but that ratio is quite flexible. In one embodiment the total bonding agent content is 4%-8% by weight of the laminae by weight. Flat panels and corrugated cores made with PRF/MDI are useful for making construction products for exterior use.

EVA (ethyl vinyl acetate) is a synthetic polymer having a broad range of uses, including uses as a bonding agent. EVA powder is useful for manufacturing wood webs for food packaging, flat panels and corrugated cores for packaging materials and non-load bearing construction projects. The wood webs remain flexible in cold conditions and are very water resistant. The corrugated wood webs must be bonded to face sheets or panels without much delay to avoid corrugation "creep" by which the corrugated sheet tends to return to a flat state. In one embodiment, EVA powder is added to the wood laminae at a ratio of about 4-8% by weight. As with PVAc powder, the amount of EVA powder that adheres to each wood lamina can be regulated by controlling a moisture content of the prepared wood laminae. Alternatively, or in addition, a small amount of water may be sprayed on the wood laminae as a mist to moisten the laminae surfaces before or during addition of the EVA powder. As well, like PVAc powder, a superior bond is achieved when 100% EVA powder is utilized if the wood laminae mat is pre-heated prior to consolidation and is finish pressed in an unheated final high-pressure press, as will be described below.

EVA powder and PRF provides flat and corrugated wood webs with greatly improved flexibility over PRF alone as well as improved water resistance. The EVA powder reduces emissions while the PRF provides the cross-linking required to control corrugation creep in a finished corrugated wood web. In one embodiment the PRF is added to the prepared wood laminae in the drum blender before the powdered EVA is added to the wood laminae. In one embodiment the EVA/PRF ratio is about 20/80-50/50, with a total concentration of bonding agent at about 4%-12% by weight of the prepared wood laminae. The higher the PRF ratio, the stronger and stiffer the finished panel. The higher the total concentration of bonding agent, the more water resistant the finished panel. Flat and corrugated panels made from EVA/PRF are useful for packaging materials and exterior construction products.

EVA powder and MDI provides a flat or corrugated wood web that is water resistant to waterproof. The MDI lends strength to the panel and provides the cross-linking required to control corrugation creep and the EVA helps reduce the amount of release agent required for press surfaces. In one embodiment the MDI is added to the prepared wood laminae in the drum blender before the powdered EVA is added to the wood laminae. The EVA/MDI ratio is flexible, but 20/80-30/70 has proven effective with a total concentration of bonding agent at about 5%-10% by weight of the prepared wood laminae. Panels made with EVA/MDI are useful for all types of packaging applications, including food packaging, as well as construction products for use in both interior and exterior applications.

Corrugated wood web production 26 is performed using an exemplary production line described below with reference to FIG. 3. When the corrugated wood web exits corrugated web production 26, it enters corrugated core processing 28 where the corrugated wood web may be edge-trimmed and bonded to one or more flat webs if the corrugated wood web is subject to corrugation creep. If the corrugated wood web is not subject to corrugation creep, it may be edge-trimmed and cut into panels of any predetermined size for corrugated panel production 32 or shipped 34 to distributors or panel manufacturers.

Figure 2:
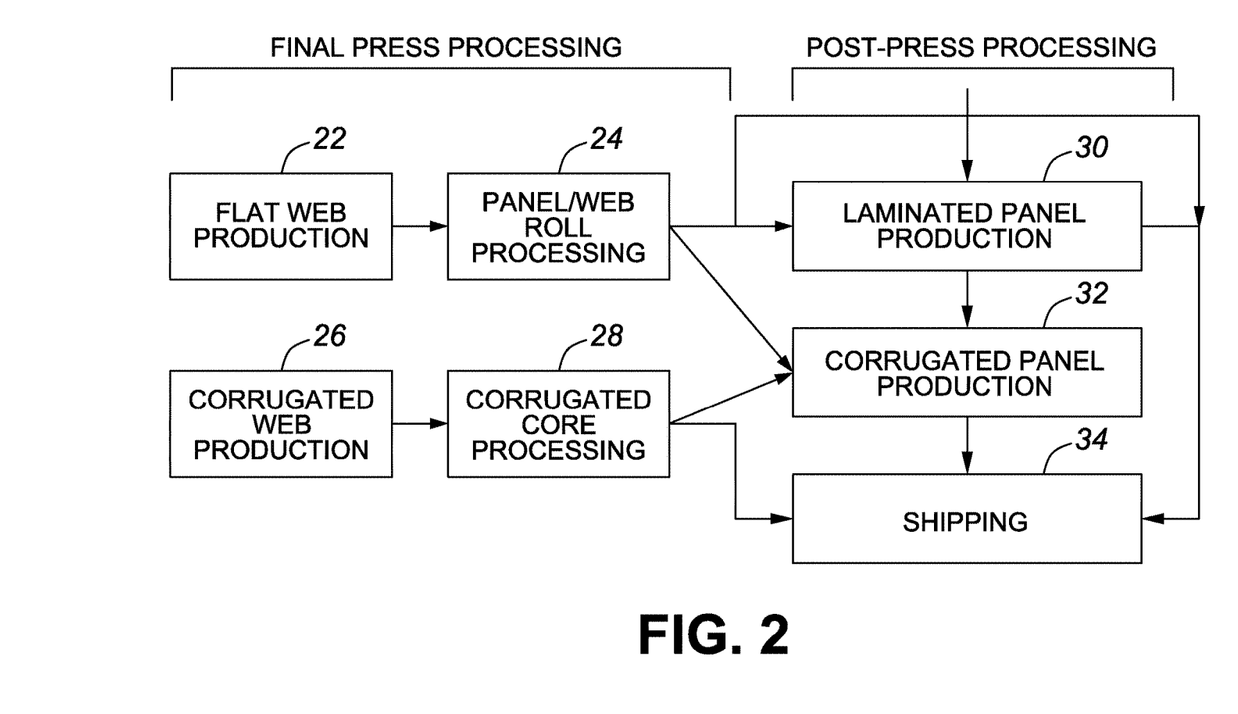
FIG. 2 is a block diagram showing details of final press finishing and post-press processing of wood webs in accordance with the invention.

FIG. 2 is a block diagram showing details of final press finishing 16 and post-press processing 18 of wood webs in accordance with the invention. As described above, wood webs in accordance with the invention may be flat webs or corrugated webs, depending on an intended use. Flat web production 22 is performed using a production line described below with reference to FIG. 4. After flat web production 22, the flat wood web enters panel/web roll processing 24. Depending on web flexibility, the finished flat webs may be surface-smoothed, edge-trimmed and rolled into flat web rolls of a predetermined diameter or weight for later processing or shipping. Thin, flexible flat web rolls may be shipped to a cardboard manufacturer where they are processed like fine kraft paper into corrugated core blanks for containers having superior strength and durability compared to those made of kraft paper cardboard. The flat web may also be surface-smoothed, edge-trimmed and cut into panels of any predetermined size for laminated panel production 30 where two or more flat panels are bonded together for extra strength and rigidity; shipped 34 to distributors or panel manufacturers; or, transferred to corrugated core processing 28 where a flat web is bonded to at least one side of a corrugated web.

Figure 3:
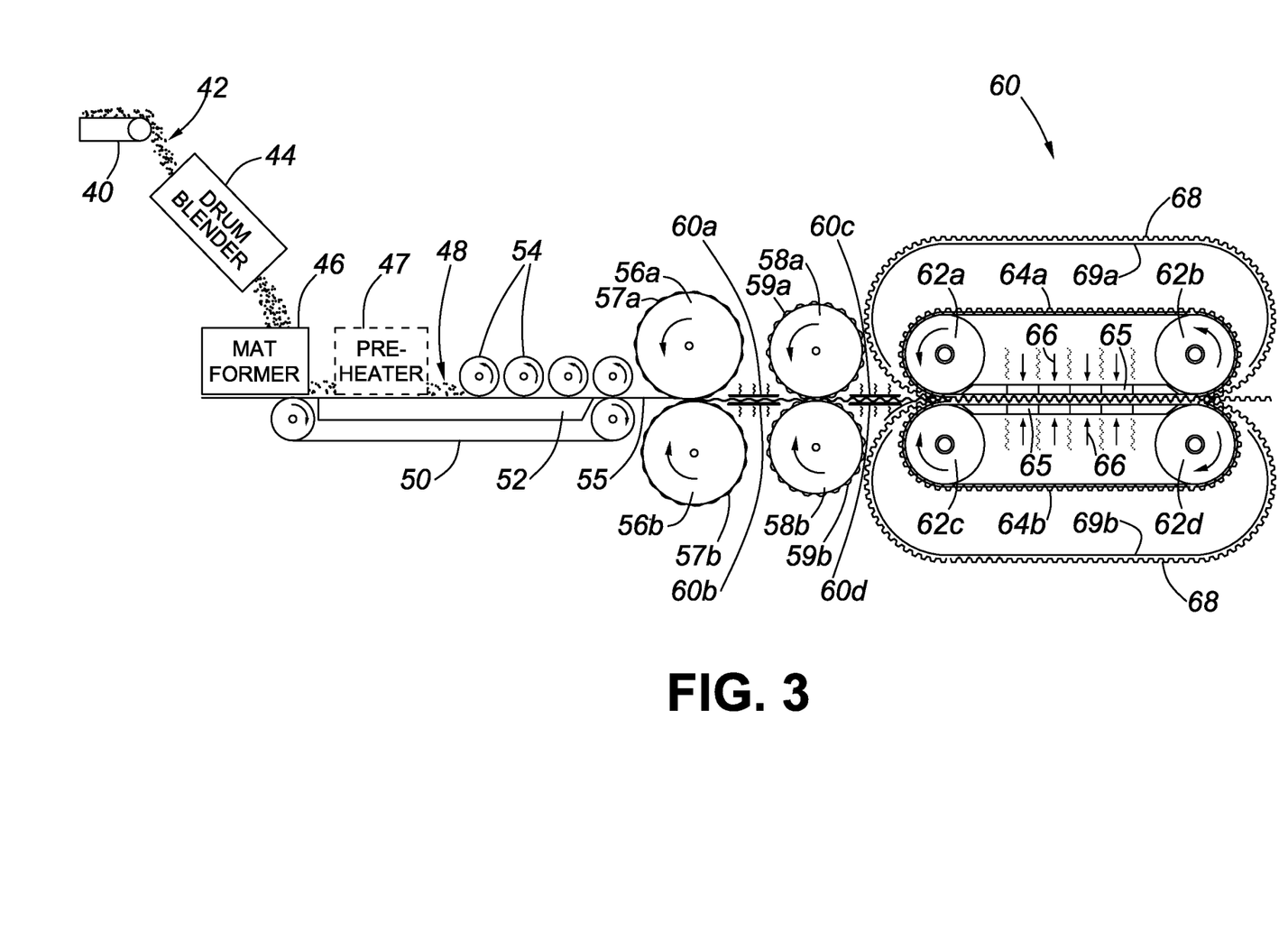
FIG. 3 is a schematic diagram of a corrugated wood web production line in accordance with the invention.

FIG. 3 is a schematic diagram of an exemplary corrugated wood web production line in accordance with the invention. For simplicity and clarity of illustration, the required supporting infrastructure and drive infrastructure are not shown. In one embodiment, a conveyer 40 conveys dried wood laminae 42 from a laminae sorter described in the above-referenced United States patent to a drum blender 44 where one or more of the bonding agents shown in Table 1 are added in a predetermined proportion by weight of the dried wood laminae. The wood laminae 42 exiting the drum blender 44 are fed to a mat former 46 known in the art that forms a mat 48 of randomly oriented wood laminae. The mat 48 is laid directly on an endless infeed belt 50 of a three-stage corrugation press. The infeed belt 50 is preferably coated with a nonstick coating or membrane to inhibit adhesion of the bonding agents applied to the wood laminae 42. The infeed belt 50 advances the mat 48 over a flat rigid base 52 that is maintained at a consolidation temperature that is principally dependent on a dwell time, i.e., a time required for the consolidating web to pass under a plurality of consolidation nip rollers 54 that compress the mat 48 into a coherent web. In one embodiment the consolidation nip rollers 54 are also coated with a nonstick coating to inhibit adhesion by the bonding agents applied to the wood laminae 42 in the drum blender 44, or appropriate release agents are applied to each roller by release agent applicators (not shown). If the bonding agent is 100% PVAc powder or 100% EVA powder, it has been determined that a quality of the inter-laminae bond in the finished web is improved if an optional pre-heater 47 pre-heats the mat 48 to soften the bonding agent powder on the wood laminae prior to consolidation in the three-stage corrugating press. For this purpose, the optional pre-heater 47 is maintained at a temperature of about 175° C. (350° F.). In one embodiment, the rigid base 52 that supports the infeed belt 50 is maintained at a mat consolidation temperature of about 93 C-121 C (200 F-250 F) and the dwell time is about 40 seconds. Each nip roller 54 applies a pressure of about 96 kilopascals (14 psi) of compressive force to the wood laminae mat being consolidated. In one embodiment, the nip rollers 54 are also heated and maintained at the consolidation temperature.

The consolidated mat 55 is drawn into a pre-former and drying press stage that includes at least two pre-former nip roller pairs 56a, 56b and 58a, 58b. Since 60° bend angles are required to form a half honeycomb corrugated web with flat crests, it has been determined that to avoid fracturing of the wood laminae fibers those bends are preferably made in at least 3 progressive stages. Consequently, the pre-former nip roller pairs 56a, 56b have a plurality of opposed, intermeshing nodes 57a, 57b that respectively transversely bend the consolidated mat 55 at predetermined spaced intervals into the pre-formed web having an intermediate half honeycomb shape with respective double reverse bends of ±20° and the pre-former nip roller pairs 58a, 58b have a plurality of opposed, intermeshing nodes 59a, 59b that respectively transversely bend the pre-formed web at the same predetermined spaced intervals into the pre-formed web having an intermediate half honeycomb shape with respective double reverse bends of ±40°. The configuration of the pre-former nip rollers 56a, 56b, 58a, 58b is described in detail in Applicant's Canadian Patent No. 2,988,159 which issued on Nov. 12, 2019, and is available to the public via the Canadian Patents Database, the specification of which is incorporated herein by reference in its entirety.

On a downstream side of the pair of pre-former nip rollers 56a, 56b are a pair of spaced-apart heated stabilizer plates 60a, 60b which dampen vibration of the pre-formed web and dry the pre-formed web, which may contain up to 20% moisture by weight in the prepared mat 48. On a downstream side of the pair of pre-former nip rollers 58a, 58b are a pair of heated stabilizer plates 60c, 60d which also dampen vibration of the pre-formed web and further dry the pre-formed web before it enters the third stage of the corrugating press. In one embodiment, the heated stabilizer plates 60a-60d are maintained at a temperature of about 93 C-121 C (200 F-250 F). In one embodiment, the third stage of the corrugation press is a corrugating final press 60 described in detail in Applicant's above-identified United States patent. The corrugating final press 60 is synchronized with the nip rollers 54, 56a, 56b, 58a, 58b to ensure that the pre-formed web 56 does not buckle or tear. In one embodiment, corrugated anti-adhesion sheets 68 are supported by curved support structures 69a, 69b. The anti-adhesion sheets 68 are as wide as the corrugation press 60 and separate corrugation lug formers 64a, 64b from the pre-formed web 56 to inhibit adhesion of the bonding agent(s) to the half-honeycomb shaped lug formers 64a, 64b. The lug formers 64a, 64b are linked together in endless belts pulled by corrugation press rollers 62a, 62b, 62c and 62d between opposed plates 65 that are forced against the lug formers 64a, 64b by opposed hydraulic or pneumatic cylinders 66 in a manner known in the art. If the bonding agents are one of 100% PVAc or 100% EVA, the opposed plates 65 of the corrugation final press are unheated and may be continuously cooled by forced air currents, or the like. For all other bonding agents and bonding agent combinations the opposed plates 65 are maintained at a temperature of about 150° C.-175° C. (300° F.-350° F.). The corrugated web output from the corrugated wood web production line is further processed as described above with reference to FIG. 2. Although the third stage of the corrugation press shown and described in this application produces half-honeycomb, flat crested corrugations, the final stage may be a series of nip rollers for making round-crested corrugations as described in Applicant's above-identified United States patent, or the former lugs may be shaped to make round-crested corrugations of various sizes.

Figure 4:
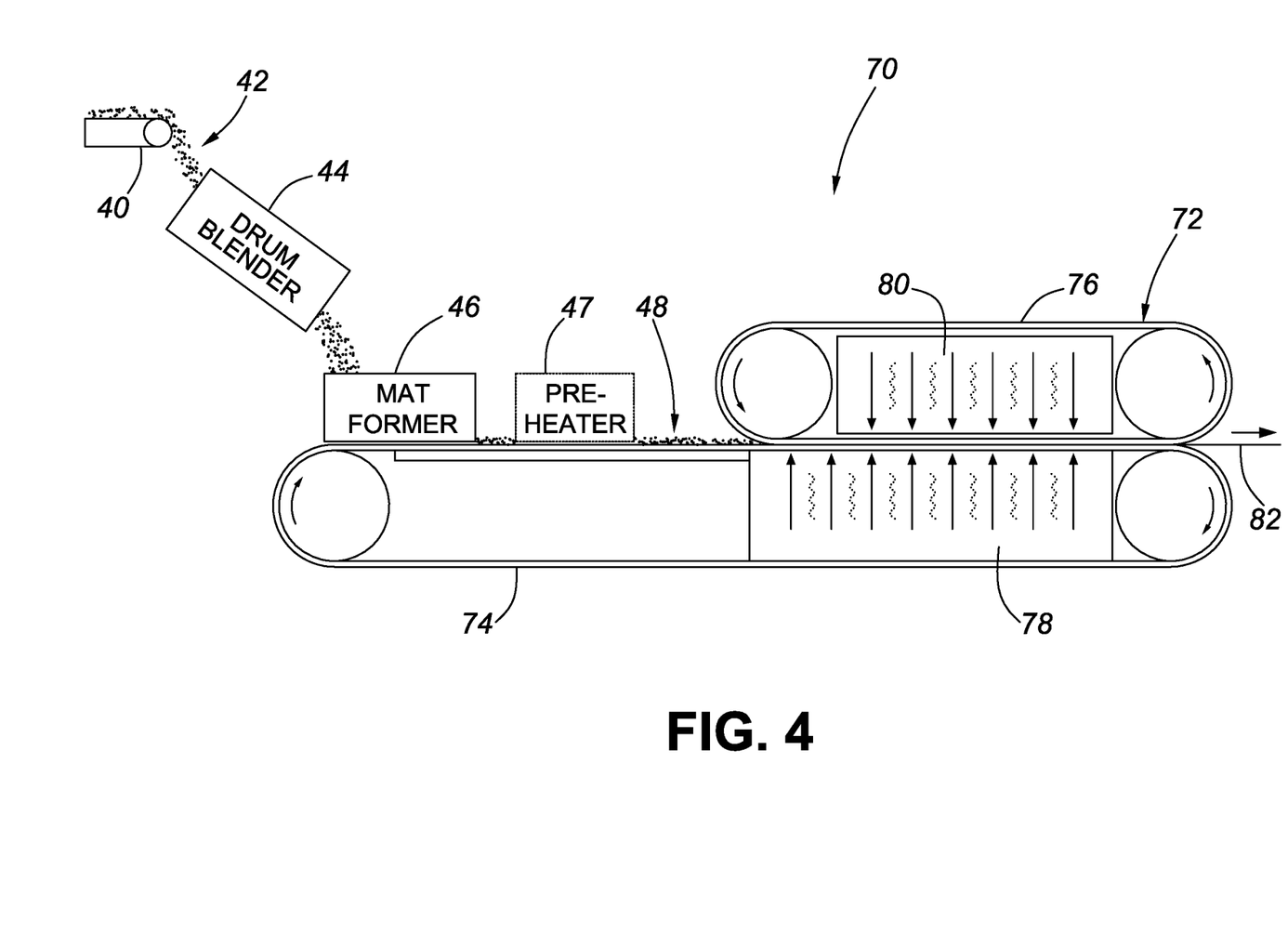
FIG. 4 is a schematic diagram of flat wood web production line in accordance with the invention.

FIG. 4 is a schematic diagram of an exemplary flat wood web production line 70 in accordance with the invention. For simplicity and clarity of illustration, web production line 70 support and drive infrastructure are not shown. The production line 70 includes the conveyor 40 that delivers dry wood laminae (about 6% moisture by weight), prepared in accordance with exacting specifications described in part above and in part in Applicant's above-identified patent, from a dryer or storage bin (not shown) for sorted laminae to a drum blender 44 where one or more of the bonding agents specified in Table 1 are added to the wood laminae in a predetermined proportion by weight of the wood laminae. The wood laminae with bonding agent(s) is moved directly or indirectly from the drum blender 44 to the mat former 46 which forms a thin mat 48 of wood laminae, a thickness of which is dependent on a thickness of the flat wood web to be produced, which is typically 0.5 mm-3.0 mm (0.02"-0.19"). The mat 48 is deposited directly on an infeed belt 74 of a novel flat web final press 72, a high-pressure press which may be similar to a Dieffenbacher CPS+® machine, for example, for the continuous production of oriented strand board, chip board, etc. The flat web final press 72 is different from prior art machines in that it has the elongated infeed belt 74, the optional pre-heater 47, and upper and lower compression units 78, 80 of the final press 72 are optionally cooled or heated. Because the mat 48 is so thin and light, no transfer of the mat 48 between the mat former 46 and an infeed belt 74 of the flat web high-pressure final press 72 is recommended. Consequently, the infeed belt 74 of the flat web final press 72 is extended to permit the mat 48 to be deposited by the mat former 46 directly onto the infeed belt 74. If the bonding agent used is one of 100% PVAc powder or 100% EVA powder, a quality of the finished web is improved if the optional pre-heater 47 pre-heats the mat 48 to soften the polymer powder prior to consolidation in the continuous flat press. For this purpose, the optional pre-heater 47 is maintained at a temperature of about 177° C. (350° F.) and the high-pressure final press is unheated and optionally continuously cooled by forced air currents, or the like. The mat 48 is compressed between the infeed belt 74 and a final press top belt 76, each of which is forced together with a compression force that is equally distributed across a width of the belts 74, 76 by the lower compression unit 78 and the upper compression unit 80. Each compression unit 78, 80 typically consists of a plurality of hydraulic or pneumatic cylinders with custom linkages to large plates that distribute force across each belt 74, 76 while permitting the belts 74, 76 to advance at an uninterrupted even rate as the mat 48 is compressed. For any mat 48 that contains at least one bonding agent that is heat set, the plates of the lower compression unit 78 and the upper compression unit 80 are heated to about 150° C.-175° C. (300° F.-350° F.), which permanently sets the heat-set bonding agent(s) applied to the wood laminae. The respective belts 74, 76 may be coated with a non-stick finish to inhibit bonding agent buildup thereon, and/or release agent(s) may be applied as needed using release agent applicators (not shown). The flat web 82 output from the flat wood web production line 70 is further processed as described above with reference to FIG. 2.

The embodiments of the invention described and illustrated are intended to be exemplary only. The scope of the invention is therefore intended to be limited solely by the scope of the appended claims.

I claim:

1. A method of manufacturing a composite wood web, comprising steps of:
   cutting wood laminae having a length of about 75 mm-150 mm, a width of about 10 mm-50 mm, and a thickness of about 0.25 mm-0.4 mm;
   drying the wood laminae to predetermined moisture content by weight of the wood laminae;
   sorting the wood laminae so that all wood laminae for the composite wood panel have dimensions within a tolerance of 5% in length and thickness and a tolerance of 10% in width;
   adding the dried, sorted wood laminae to a blender;
   applying a first bonding agent to the wood laminae in the blender using a spray applicator;
   applying a second, powdered bonding agent to the wood laminae in the blender after the first bonding agent has been applied to the wood laminae in the blender;
   moving the wood laminae from the blender to a mat former;
   forming the wood laminae into a mat of randomly oriented wood laminae on an infeed of a high-pressure final press, the mat having a thickness adequate to produce a web of 0.5 mm-3 mm; and
   final pressing the mat in the high-pressure final press to permanently set the at least one bonding agent to produce a composite wood web.

2. A method of manufacturing a corrugated composite wood web, comprising steps of:
   cutting wood laminae having a length of about 75 mm-150 mm, a width of about 10 mm-50 mm, and a thickness of about 0.25 mm-0.4 mm;
   drying the wood laminae to predetermined moisture content by weight of the wood laminae;
   sorting the wood laminae so that all wood laminae for the composite wood panel have dimensions within a tolerance of 5% in length and thickness and a tolerance of 10% in width;
   adding the dried, sorted wood laminae to a blender;
   applying a first bonding agent to the wood laminae in the blender using a spray applicator;
   applying a second, powdered bonding agent to the wood laminae in the blender after the first bonding agent has been applied to the wood laminae in the blender;
   moving the wood laminae from the blender to a mat former;
   forming the wood laminae into a mat of randomly oriented wood laminae, the mat having a thickness adequate to produce a web of 0.5 mm-3 mm;
   consolidating the mat in a low-temperature, low-pressure consolidation stage of a three-stage corrugation press to form a flat consolidated wood web;
   pre-forming the flat consolidated wood web in a low-temperature pre-forming stage of the three-stage corrugation press to pre-form corrugation bends in the flat consolidated wood web; and
   fully corrugating the wood web with pre-formed corrugation bends in a high-pressure corrugating press section of the three-stage corrugation press to produce a corrugated wood web.

3. The method as claimed in claim 2 further comprising optionally heating the mat in a mat pre-heater prior to consolidating the mat in the low-temperature, low-pressure consolidation stage of a three-stage corrugation press.

4. The method as claimed in claim 3 wherein the consolidation stage of the three-stage corrugation press comprises a plurality of nip rollers that compress the mat against an endless consolidation belt supported by a rigid flat base maintained at the consolidation temperature.

5. The method as claimed in claim 2 wherein pre-forming the corrugation bends in the consolidated web comprises pre-forming the consolidated web between a first pair of opposed nip rollers having intermeshing nodes configured to transversely bend the consolidated web at predetermined spaced intervals, and further pre-forming the consolidated web between a second pair of opposed nip rollers having intermeshing nodes configured to further transversely bend the consolidated web at the predetermined spaced intervals.

6. The method as claimed in claim 2 wherein applying the first and second bonding agents to the wood laminae comprises adding phenol resorcinol formaldehyde (PRF) at about 4%-12% by weight of the wood laminae, and one of: polyvinyl acetate (PVAc) powder at about 4%-8% by weight of the wood laminae, and ethyl vinyl acetate (EVA) powder at about 4%-8% by weight of the wood laminae.

7. The method as claimed in claim 2 wherein applying the first and second bonding agents to the wood laminae comprises adding diphenylmethane diisocyanate (MDI) at about 4%-12% by weight of the wood laminae, and one of: polyvinyl acetate (PVAc) powder at about 4%-8% by weight of the wood laminae, and ethyl vinyl acetate (EVA) powder at about 4%-8% by weight of the wood laminae.

8. The method as claimed in claim 2 wherein applying the first and second bonding agents to the wood laminae comprises adding from about 50%-80% phenol resorcinol formaldehyde (PRF) and about 20%-50% polyvinyl acetate (PVAc) powder at a combined total of the first and second bonding agents of about 4%-12% by weight of the wood laminae.

9. The method as claimed in claim 2 wherein applying the first and second bonding agents to the wood laminae comprises adding from about 70%-80% diphenylmethane diisocyanate (MDI) and about 20%-30% polyvinyl acetate (PVAc) powder at a combined total of the first and second bonding agents of about 5%-10% by weight of the wood laminae.

10. The method as claimed in claim 2 wherein applying the first bonding agent to the wood laminae comprises adding from about 30% phenol resorcinol formaldehyde (PRF) and about 70% diphenylmethane diisocyanate (MDI) to about 50% PFR and about 50% MDI at a combined total of the first bonding agent of about 4%-8% by weight of the wood laminae.

11. The method as claimed in claim 2 wherein applying the first and second bonding agents to the wood laminae comprises adding from about 70%-80% diphenylmethane diisocyanate (MDI) to about 20%-30% ethyl vinyl acetate- (EVA) powder at a combined total of the first and second bonding agents of about 5%-10% by weight of the wood laminae.

12. The method as claimed in claim 2 wherein applying the first and second bonding agents to the wood laminae comprises adding from about 50%-80% phenol resorcinol formaldehyde (PRF) to about 20%-50% ethyl vinyl acetate (EVA) powder at a combined total of the first and second bonding agents of about 4%-12% by weight of the wood laminae.

* * * * *